United States Patent
Jeong et al.

(10) Patent No.: US 7,698,492 B2
(45) Date of Patent: Apr. 13, 2010

(54) GUARANTEED SERVICES METHOD AND APPARATUS IN BRIDGED LAN

(75) Inventors: Hong-kyu Jeong, Yongin-si (KR); Byung-suk Kim, Uiwang-si (KR); Fei fei Feng, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 347 days.

(21) Appl. No.: 11/779,348

(22) Filed: Jul. 18, 2007

(65) Prior Publication Data

US 2008/0008200 A1 Jan. 10, 2008

Related U.S. Application Data

(63) Continuation-in-part of application No. 11/412,826, filed on Apr. 28, 2006, now Pat. No. 7,574,550.

(60) Provisional application No. 60/699,387, filed on Jul. 15, 2005, provisional application No. 60/675,465, filed on Apr. 28, 2005.

(30) Foreign Application Priority Data

Mar. 9, 2006 (KR) ............ 10-2006-0022183

(51) Int. Cl.
*G06F 13/36* (2006.01)
*G06F 13/42* (2006.01)

(52) U.S. Cl. .................. 710/311; 710/106; 710/310

(58) Field of Classification Search ........ 710/105–106, 710/305–315; 714/18, 34; 709/230–232
See application file for complete search history.

(56) References Cited

U.S. PATENT DOCUMENTS

| 6,078,976 | A  | * | 6/2000  | Obayashi ............... 710/315 |
| 6,363,068 | B1 | * | 3/2002  | Kinoshita .............. 370/389 |
| 6,557,067 | B1 | * | 4/2003  | James et al. ............ 710/306 |
| 6,611,892 | B1 | * | 8/2003  | Sasaki et al. ............ 710/306 |
| 6,751,697 | B1 | * | 6/2004  | Shima et al. ............ 710/306 |
| 6,981,146 | B1 | * | 12/2005 | Sheymov ............... 713/172 |
| 2001/0037422 | A1 | * | 11/2001 | Thaler et al. ........... 710/126 |
| 2003/0053466 | A1 | * | 3/2003  | Bizet et al. ............. 370/401 |
| 2005/0228929 | A1 | * | 10/2005 | Penton et al. ........... 710/306 |

(Continued)

FOREIGN PATENT DOCUMENTS

EP            933900 A2 *  8/1999

(Continued)

OTHER PUBLICATIONS

Kim, Mihui et al. "Dynamic VLAN Registration Mechanism on EoMPLS". IEEE. 2003. Pqages 208-212.*
Feng, Feifei et al. "End-to-end Stream Establishment in Consumer Home Networks". IEEE. 2006 Consumer Communications and Networking Conference. Jan. 8-10, 2006. pp. 888-891.*

(Continued)

*Primary Examiner*—Thomas J Cleary
(74) *Attorney, Agent, or Firm*—Sughrue Mion, PLLC

(57) ABSTRACT

Provided are a guaranteed services method and apparatus in bridged LAN. streams are transmitted through bridges to a plurality of listener stations in a distributed network, and each bridge performs filtering, stream group registration and authentication for the streams. Accordingly, quality of service (QoS) in a distributed network can be improved. Furthermore, streams to the plurality of listener stations can be guaranteed.

8 Claims, 8 Drawing Sheets

U.S. PATENT DOCUMENTS

2006/0010253 A1 * 1/2006 Aiken et al. ................ 709/250

FOREIGN PATENT DOCUMENTS

| EP | 1113625 | A2 | * | 7/2001 |
| WO | WO 0138996 | A1 | * | 5/2001 |

OTHER PUBLICATIONS

Feng, Felix. "GARP Stream Reservation Protocol". Initial Draft. 29-Deember 2005.*

Choi, Jinseek. "Centralized Admission Control Mechanism for SRP". Jul. 2006.*

Feng, Felix Feifei. "GARP-based Simple Reservation Protocol". IEEE 802.3 RESG. Jul. 2005. San Francisco, CA, USA.*

* cited by examiner

GUARANTEED SERVICES METHOD AND APPARATUS IN BRIDGED LAN

CROSS-REFERENCE TO RELATED APPLICATIONS

This is a Continuation-In-Part of application Ser. No. 11/412,826 filed Apr. 28, 2006, now U.S. Pat. No. 7,574,550 which claims priority from Korean Patent Application No. 10-2006-22183 filed on Mar. 9, 2006, in the Korean Intellectual Property Office and from U.S. Provisional Patent Application No. 60/699,387 filed Jul. 15, 2005, and U.S. Provisional Patent Application No. 60/675,465 filed Apr. 28, 2005 in the United States Patent and Trademark Office, the disclosures of which are incorporated herein by reference.

BACKGROUND OF THE INVENTION

1. Field of the Invention

The present invention relates to a guaranteed services method and apparatus in bridged LAN. More particularly, the present invention relates to a guaranteed services method and apparatus in a bridged LAN that provides streams through bridges in a distributed network, filters the streams, and registers and authenticates stream groups so that the quality of service (QoS) can be improved.

2. Description of the Related Art

Generally, a bridge apparatus for a distributed network connects two or more local area networks (LANs) employing the same protocol. The bridge apparatus can also connect two segments to the same LAN.

IEEE 802.1 defines standard characteristic of a bridge. A basic bridge has a plurality of ports connected to a plurality of separated LANs. A frame received at one port is re-transmitted to another port. The bridge re-transmits all data frame irrespective of whether or not it is necessary. A learning bridge investigates a source field of the entire data frame found in each port to generate a table that defines each port as connected to a particular address.

Accordingly, if the data frame that is addressed to a destination is found in its own address table, the bridge transmits the data frame only to the port related to the address, unless the destination address is connected to the same port to input the data frame.

Various protocols have been introduced to provide optimal quality of service (QoS) when data is transmitted through the bridge in the distributed network. For example, the various protocols include differentiated services (Diffserv), integrated services (Intserv), and resource reservation protocol (RSVP).

In case of RSVP, subnet bandwidth managers (SBM) for LAN are variant, and the RSVP has a high complexity and is unfriendly to IEEE 802.1.

In case of the link layer reservation management protocol (LLRMP), which is a source initiated resource reservation, the integration with service is not considered.

In case of the listener station initiating protocol based on generic attribute registration protocol (GARP), no reservation is necessary and no justification exists.

In case of the listener station initiating protocol based on the RSVP, it has a high complexity and is unfriendly to IEEE 802.1.

SUMMARY OF THE INVENTION

The present invention has been conceived to address the above-mentioned problems occurring in the prior art. An aspect of the present invention is to provide a guaranteed services method and apparatus in a bridged LAN that provides media streams through a bridge in a distributed network, filters streams, and registers and authenticates stream groups so that the quality of service (QoS) can be improved.

According to an aspect of the present invention, there is provided a bridge apparatus that receives a stream from a talker station and relays the stream to a listener station, the bridge apparatus including a path provider which configures a relay path to relay the stream, and a stream group filtering unit which determines a filtering or a forwarding of the stream on the basis of a stream identifier allocated to each stream for stream services in the configured relay path.

The bridge apparatus further includes a reservation status database, and the stream group filtering unit forwards the stream depending on the reservation status database.

The stream identifier includes a virtual local area network (VLAN) tag, a password, or media access control (MAC) address.

The reservation status database includes a stream filtering database that specifies a certain outbound port to forward or filter the stream.

The stream is forwarded through the outbound port explicitly enabled in the stream filtering database.

The stream filtering database includes static filtering entries, dynamic filtering entries, group registration entries, and stream group registration entries.

The stream group registration entries include a stream identifier, a reservation port map, and a stream port map.

The reservation port map consists of a control element for each outbound port that specifies forwarding or filtering of reservation signal frame with the associated stream, and the stream port map consists of a control element for each outbound port that specifies forwarding or filtering of frames with the associated stream.

In filtering, the stream port map can have additional substates indicating the reason of filtering: "Initial", "Admission Control Failure", "and "Time Out".

The path provider includes a stream subscription/secession protocol unit which transmits a subscription/secession request for the streams from the listener station to the talker station and transmits a response for the streams from the talker station to the listener station, and an authentication unit which provides the authenticated relay path between the talker station and the listener station on the basis of a configuration and a key for the stream services as the subscription is completed.

According to another aspect of the current invention, there is provided a guaranteed services method that receives a stream from a talker station and relays the stream to a listener station, the method including operations of configuring a relay path to relay the stream, and streaming to determine a filtering or a forwarding of the stream on the basis of a stream identifier allocated to each stream in the configured relay path.

The stream identifier includes a virtual local area network (VLAN) tag, a password, or media access control (MAC) address.

The method further includes storing a reservation status in a reservation status database, if the forwarding is determined in the streaming operation, and forwarding the stream depending on the reservation status database.

The reservation status database includes a stream filtering database that specifies a certain outbound port to forward or filter the stream.

The stream is forwarded through the outbound port explicitly enabled in the stream filtering database.

The stream filtering database includes stream group registration entries, and the group registration entries comprise a stream identifier, a reservation port map, and a stream port map. The reservation port map consists of a control element for each outbound port that specifies forwarding or filtering of reservation signal frame with the associated stream, and the stream port map consists of a control element for each outbound port that specifies forwarding or filtering of frames with the associated stream.

The operation of configuring a relay path includes operations of subscribing/seceding which transmits a subscription/secession request for the streams from the listener station to the talker station and also transmits a response for the streams from the talker station to the listener station, and authenticating which provides the authenticated relay path between the talker station and the listener station on the basis of a configuration and a key for the stream services as the subscription is completed.

The operation of subscribing/seceding uses generic attribute registration/stream reservation protocol (GSRP). If an admission control is successful, the operation of authenticating triggers admission control operations according to a reservation signaling, and locks resources.

In the operation of authenticating, the configuration is to determine whether or not the stream, which enters a bridge, is transmitted using port information on whether or not a certain port stored in the bridge can transmit a certain stream. According to another aspect of the current invention, there is provided a relay method including receiving messages from a station; stopping output of the received messages if a port to receive the messages is changed; and restarting the output of the received messages if port information of a previously received message is the same as port information of a currently received message.

The station may be a talker station or a listener station.

The restarting may include storing the received messages in a buffer; and determining whether the last message stored in the buffer and the currently received message are received from the same port.

The restarting may include counting the number of cases in which the port information of the previously received message is the same as the port information of the currently received message; and restarting the output of the received messages, if the counted number of cases is greater than a reference value.

According to another aspect of the current invention, there is provided a relay method including receiving messages, to which serial numbers are assigned, from a station; stopping output of the received messages if a port to receive the messages is changed; and comparing a serial number of a previously received message to a serial number of a currently received message, and restarting the output of the received messages if the messages are received according to the order in which the messages are sent from the station.

According to another aspect of the current invention, there is provided a relay method including receiving messages, to which priorities are assigned, from a station; stopping output of the received messages if a port to receive the messages is changed; and comparing a priority of a previously received message to a priority of a currently received message, and restarting the output of the received messages if the messages are received according to the priority.

According to another aspect of the current invention, there is provided a bridge apparatus including a port which receives messages transmitted from a station; and a controller which stops output of the received messages if the port to receive the messages is changed, and restarts the output of the received messages if port information of a previously received message is the same as port information of a currently received message.

The station may be a talker station or a listener station.

The bridge apparatus may further include a buffer which stores the received messages. The controller may determine whether the last message stored in the buffer and the currently received message are received from the same port.

The controller may count the number of cases in which the port information of the previously received message is the same as the port information of the currently received message, and may restart the output of the received messages if the counted number of cases is greater than a reference value.

According to another aspect of the current invention, there is provided a bridge apparatus including a port which receives messages, to which serial numbers are assigned, from a station; and a controller which stops output of the received messages if a port to receive the messages is changed, compares a serial number of a previously received message to a serial number of a currently received message, and restarts the output of the received messages if the messages are received according to the order in which the messages are sent from the station.

According to another aspect of the current invention, there is provided a bridge apparatus including a port which receives messages, to which priorities are assigned, from a station; and a controller which stops output of the received messages if a port to receive the messages is changed, compares a priority of a previously received message to a priority of a currently received message, and restarts the output of the received messages if the messages are received according to the priority.

BRIEF DESCRIPTION OF THE DRAWINGS

The above and other aspects of the present invention will be more apparent by describing certain exemplary embodiments of the present invention with reference to the accompanying drawings, in which.

DETAILED DESCRIPTION OF THE EXEMPLARY EMBODIMENTS

Figure 1:
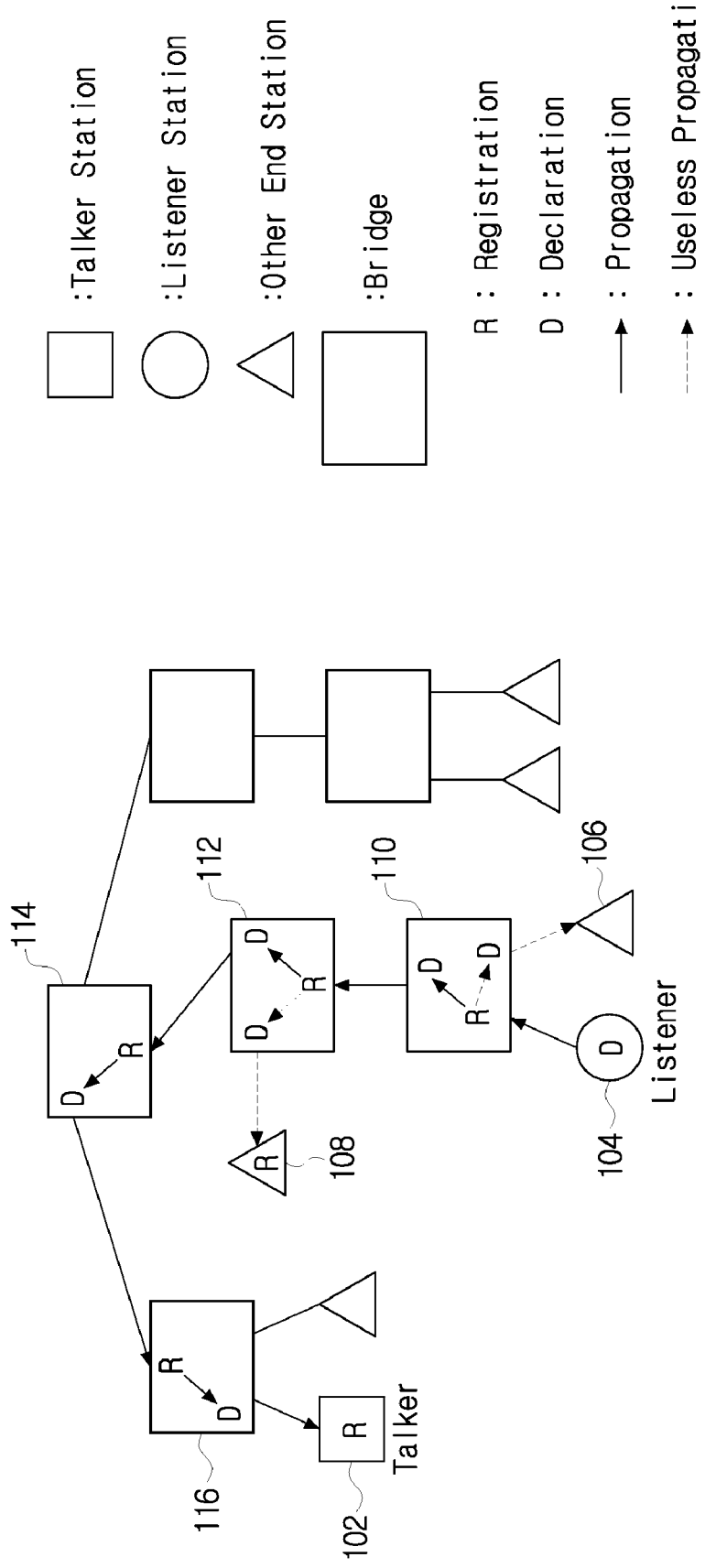
FIG. 1 is a view illustrating a process requesting a stream from a listener station to a talker station in a guaranteed services method according to an exemplary embodiment of the present invention.

Exemplary embodiments of the present invention will be described in detail with reference to the annexed drawings. In the drawings, the same elements are denoted by the same reference numerals throughout the drawings. In the following description, detailed descriptions of known functions and configurations incorporated herein have been omitted for conciseness and clarity.

FIG. 1 is a view illustrating a process requesting a stream from a listener station to a talker station in a guaranteed services method according to an exemplary embodiment of the present invention.

The guaranteed services method according to an exemplary embodiment of the present invention may be applied to a bridged LAN system. The bridged LAN system according to an exemplary embodiment of the present invention comprises a talker station 102, a listener station 104, other end stations 106 and 108, and a plurality of bridges 110-116.

The talker station 102 may include a device providing streams such as a DVD player. As the listener station 104 requests streams, the talker station 102 reserves streams for the listener station 104, and provides reservation information to the listener 104. The talker station 102 also transmits the streams to the listener station 104 according to the reservation information.

The listener station 104, such as a digital TV, may request streams and receive the streams through the bridge.

The bridges 110-116, which provide a path to relay the streams, transmit the request for media streams from the listener 104 to the talker station 102, and receive the stream reservation information from the talker station 102 to transmit to the listener station 104.

The bridges 110-116 has therein a stream group filtering unit, a stream subscription/secession protocol unit, and an authentication unit.

In the bridges 110-116, the stream group filtering unit filters the streams received from the talker station 102 on the basis of the stream identifier assigned to each stream for stream services to determine whether or not the stream is forwarded to the listener station 104 depending on the filtering result. To this end, the bridges 110-116 comprises a reservation state database, and forwards the stream according to the reservation state database. Here, the reservation state database includes the stream filtering database. The stream filtering database defines a certain outbound port to forward the stream or filter the certain stream data frame. The default value of the stream filtering database is set to "filtering". The stream data frame is forwarded through the outbound port explicitly enabled in the stream filtering database.

The stream identifier comprises a virtual local area network (VLAN) tag, a password, or media access control (MAC) address.

The stream subscription/secession protocol unit transmits the request for the streams from the listener station 104 to the talker station 102 so as to register the streams in the talker station 102, and receives the reservation information for the streams from the talker station 102 to transmit to the listener station 104. Here, the subscription/secession protocol is employed to manage streams by updating stream filtering database of each bridge along the stream paths.

The stream filtering database of each of bridges 110-116 comprises static filtering entries, dynamic filtering entries, group registration entries, and stream group registration entries.

The group registration entries of each stream comprise a stream identifier, a reservation port map, and a stream port map. The reservation port map consists of a control element for each outbound port that specifies forwarding or filtering of reservation signaling frame with the associated stream. The stream port map consists of a control element for each outbound port that specifies forwarding or filtering of frames with the associated stream. The stream port map can have additional sub-states indicating the reason of filtering: "Initial", "Admission Control Failure", "and "Time Out". Those state indicators can also be stored in another separate map. The default value of the stream port map is "Initial".

The stream group registration entries are created, modified and deleted by the GARP (generic attribute registration protocol) stream reservation protocol (GSRP).

The signaling of the subscription/secession protocol frame is divided into a GARP based signaling and a reservation signaling.

The listener station 104 uses GARP to show its intention of joining specified stream. With the GARP registration, the talker station 102 and the bridges can know the location of the listener station 104 and the method sending the data to the listener station 104.

The talker station 102 transmits the reservation signaling through the bridges to the listener station 104. If an admission control is successful, the bridges triggers the admission control operations according to the reservation signaling, and locks resources.

The authentication unit performs authentication between the talker station 102 and the listener station 104 on the basis of the configuration and the key of the bridges for the stream services, and authorizes connection of the accessible listener stations and talker stations in a session. The bridges are configured to determine whether or not the stream, which enters the bridges, is transmitted using the port information on whether or not a certain port stored in the bridges can transmit a certain stream.

In FIG. 1, the listener station 104 requests the talker station 102 for the streams through the bridges 110-116. Accordingly, the stream request data is transmitted through the first bridge 110, the second bridge 112, the third bridge 114, and the fourth bridge 116 to the talker station 102. In other words, the listener station 104 requests the talker station 102 for the registration of the services. Accordingly, the stream request data may be defined as the data of requesting the registration for the services.

The bridges 110-116 transmit the registration request data to the talker station 102 according to the stream subscription protocol unit. Here, the registration request data includes the stream identifier of the listener station 104.

The talker station 102 registers the listener station 104 in the stream services on the basis of the stream identifier according to the stream registration request. Also, the talker station 102 reserves the providing of the stream to the listener station 104.

With the GSRP registration, the talker station 102 and the bridges 110-116 can know the location of the listener station 104 and the method sending to the listener station 104.

Figure 2:
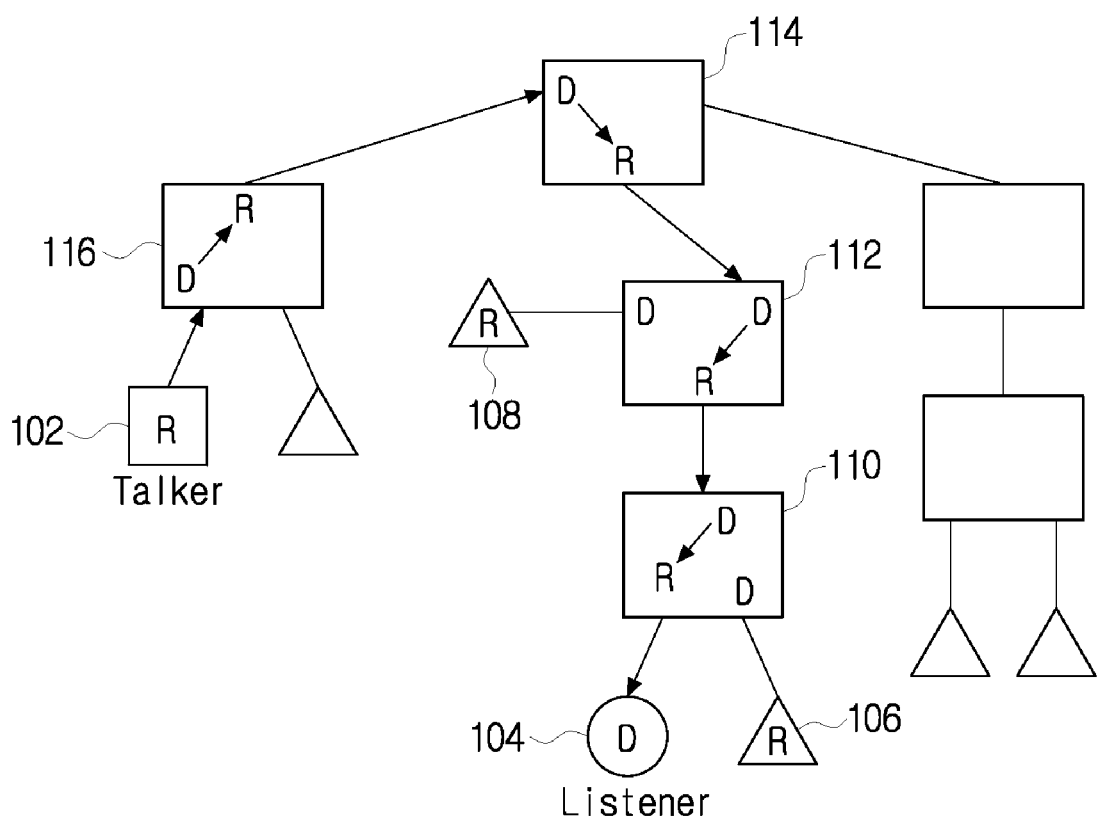
FIG. 2 is a view illustrating a process transmitting reservation signaling from a talker station to a listener station in a guaranteed services method according to an exemplary embodiment of the present invention.

FIG. 2 is a view illustrating a process transmitting reservation signaling from a talker station to a listener station in a guaranteed services method according to an exemplary embodiment of the present invention.

After registering the listener station 104 in the services, the talker station 102 transmits the reservation signaling frame, which reserves the providing of streams to the listener station 104, through the bridges 110-116. The reservation signaling frame includes a stream identifier, a talker address, a resource requirement, a subscription status, and an error code. The resource requirement includes a requested bandwidth and a reserved-bandwidth.

If the admission control is successful for the reservation signaling frame, the bridges 110-116 trigger admission control operations. The bridges 110-116 lock the resources and updates filtering database.

The bridges 110-116 control each outbound port that specifies forwarding or filtering of the reservation signaling frame according to the reservation port map with respect to the streams.

Accordingly, the reservation signaling frame is transmitted from the talker station 102 through the fourth bridge 116, the third bridge 114, the second bridge 112, and the first bridge 110 to the listener station 104. Accordingly, the reservation signaling, such as end-to-end "ACK" signaling, is transmitted to the listener station 104.

Figure 3:
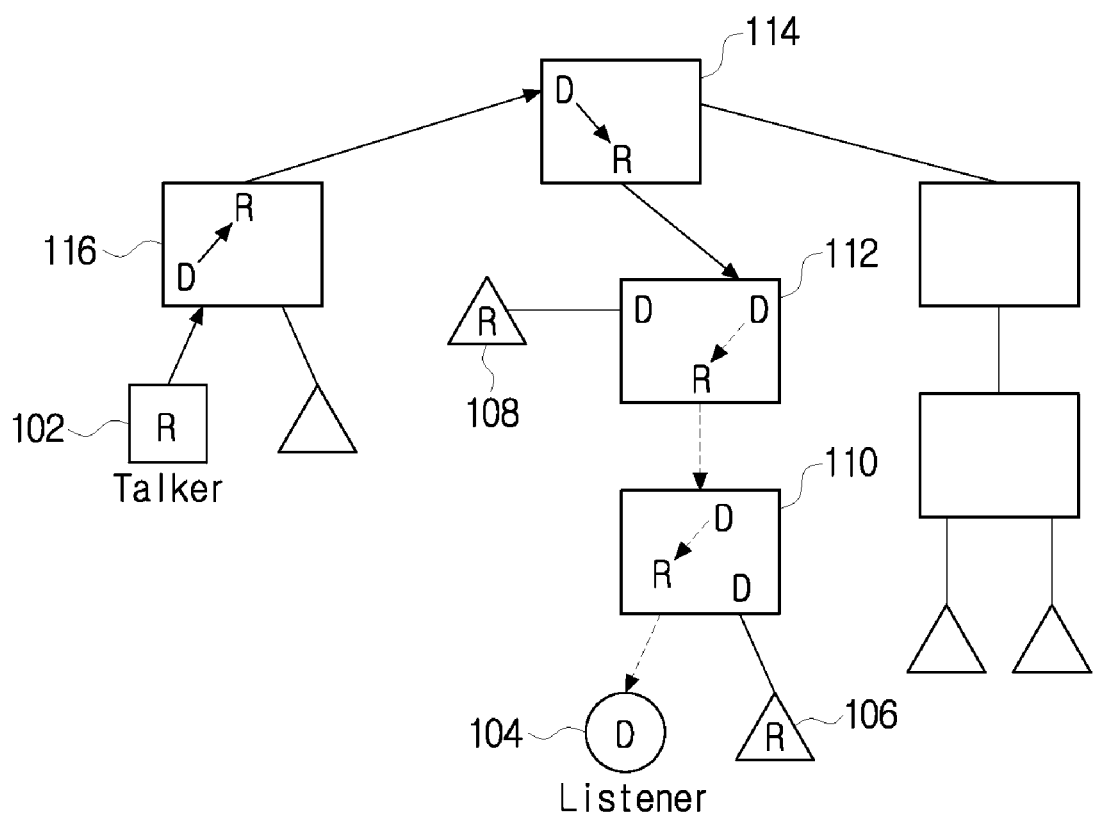
FIG. 3 is a view illustrating a failed example of a process transmitting reservation signaling from a talker station to a listener station in a guaranteed services method according to an exemplary embodiment of the present invention.

FIG. 3 is a view illustrating a failed example of a process transmitting reservation signaling from a talker station to a listener station in a guaranteed services method according to an exemplary embodiment of the present invention.

In FIG. 3, the reservation signaling frame is transmitted from the talker station 102 through the fourth bridge 116 and the third bridge 114 to the second bridge 112, and the transmission fails at the second bridge 112.

In other words, the admission control fails at the second bridge 112, and the status indication (SI) of the reservation signaling is set to FAILED.

Accordingly, the forwarding of the reservation signaling is stopped in the direction of the listener station 104, and the downstream bridges 112 and 110 do not lock resources as the SI of the reservation signaling is set to FAILED.

The listener station 104 recognizes the failure since the reservation signaling of FAILED SI is transmitted from the bridge 110 to the end-to-end "NACK".

Figure 4:
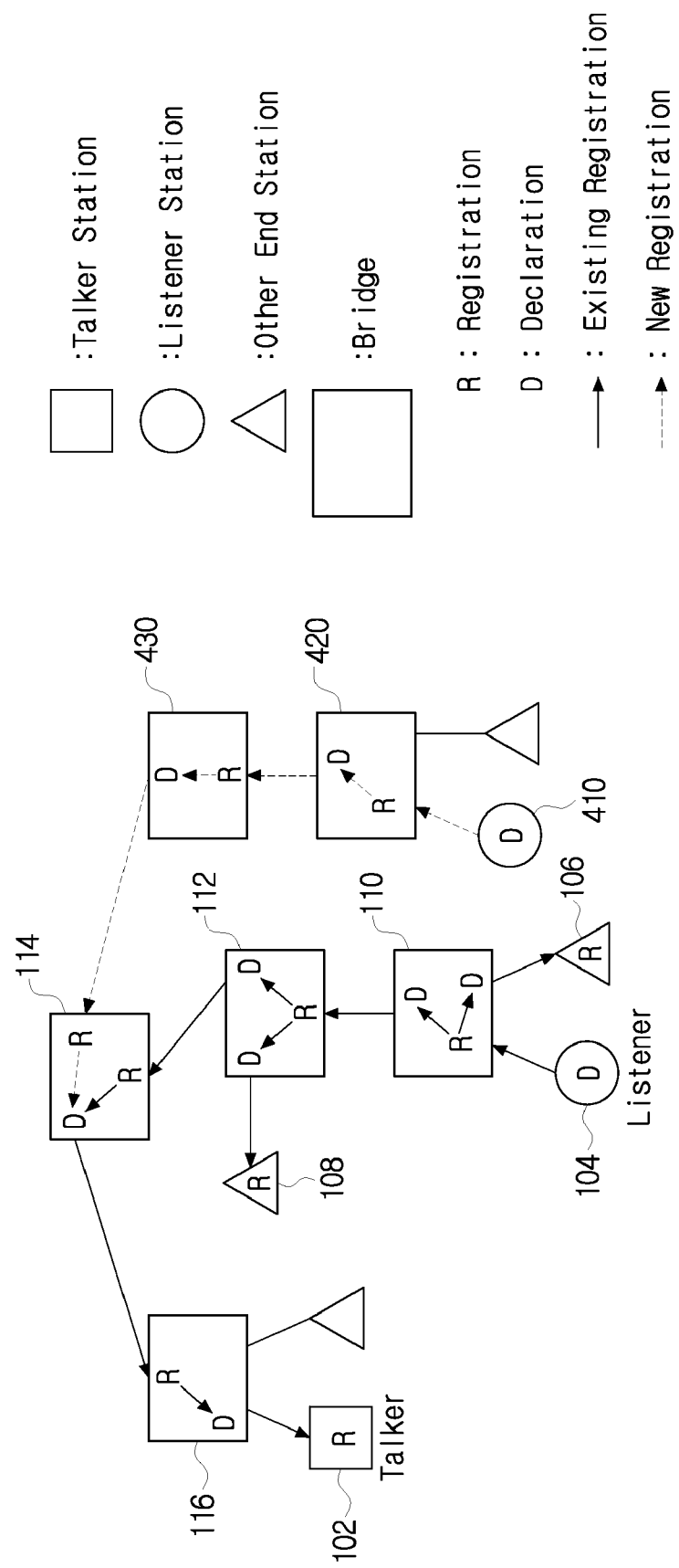
FIG. 4 is a view illustrating a process registering a second listener station when a first listener station is registered in a guaranteed services method according to an exemplary embodiment of the present invention.

FIG. 4 a view illustrating a process registering a second listener station when a first listener station is registered in a guaranteed services method according to an exemplary embodiment of the present invention.

As shown in FIG. 4, the first listener station 104 is registered in the services of the talker station 102 through the first bridge 110, the second bridge 112, the third bridge 114, and the fourth bridge 116. Under this circumstance, the second listener station 410 requests to be registered in the services via the fifth bridge 420 and the sixth bridge 430.

The path from the second listener station 410 via the fifth bridge 420 and the sixth bridge 430 is connected to the third bridge 114 according to multicast tree topology.

The third bridge 114 merges the registration request data from the second listener station 410 in a stream session with the registration of the first listener station 104 to transmit the data through the fourth bridge 116 to the listener station 102.

Figure 5:
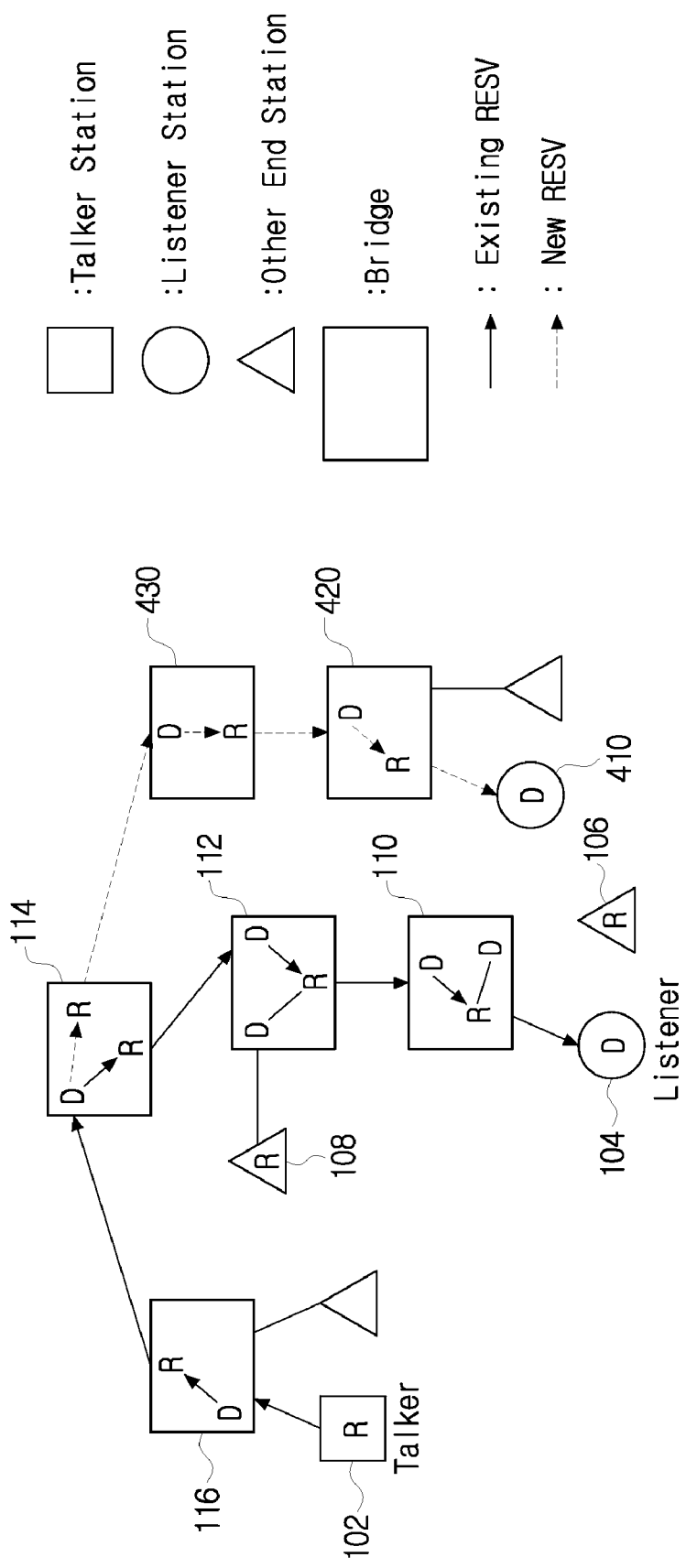
FIG. 5 is a view illustrating a process transmitting new reservation signaling to a second listener station in a guaranteed services method according to an exemplary embodiment of the present invention.

FIG. 5 is a view illustrating a process transmitting new reservation signaling to a second listener station in a guaranteed services method according to an exemplary embodiment of the present invention.

In FIG. 5, the talker station 102 transmits a new reservation signaling via the fourth bridge 116, the third bridge 114, the sixth bridge 430, and the fifth bridge 420 to the second listener station 410 upon receiving the registration request for the stream services from the second listener station 410. Here, the reservation response delay is disassociated from the reservation refresh timer value.

The SI of the new reservation signaling is set to either SUCCESSFUL or FAILED according to the reservation state in upstream.

The talker station 102 can make use of the stream membership information registered via GSRP to allow it to keep track of the set of streams for which active listeners currently exist.

The registration process and the reservation process are on the basis of soft-state signaling mechanism. Here, the status is periodically refreshed according to a hop-by-hop scheme. In both the registration process and the reservation process the signaling message is merged in the bridges.

The bridges 110-116 control each outbound port that specifies the forwarding or filtering of the frame according to the stream port map with the associated stream.

Figure 6:
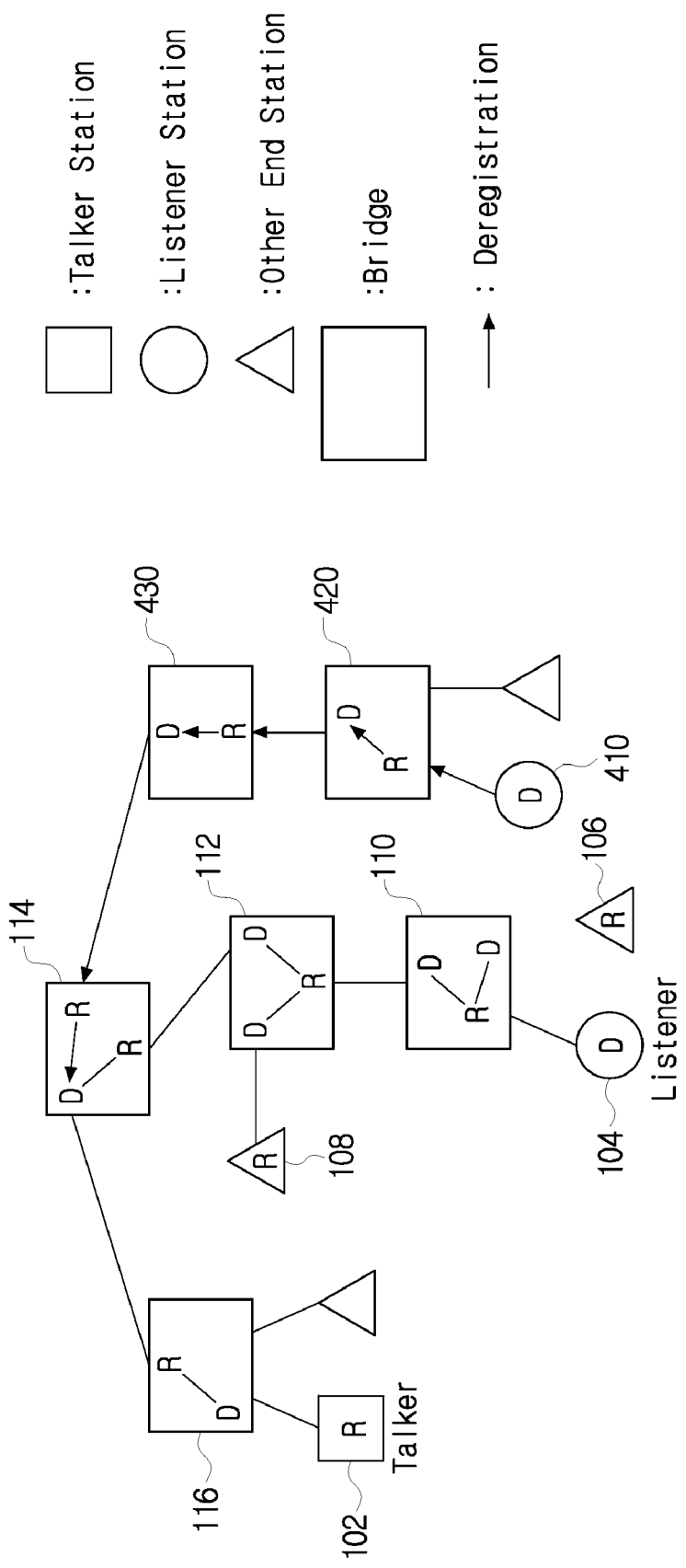
FIG. 6 is a view illustrating a process de-registering a stream in a guaranteed services method according to an exemplary embodiment of the present invention.

FIG. 6 is a view illustrating a process de-registering a stream in a guaranteed services method according to an exemplary embodiment of the present invention.

In FIG. 6, the second listener station 410 uses GARP de-registration to stop receiving stream.

The de-registration request data is transmitted from the second listener station 410 to the fifth bridge 420, the sixth bridge 430 and the third bridge 114.

Upon GSRP de-registration, the fifth bridge 420, the sixth bridge 430, and the third bridge 114 release the resource that has been previously locked for the second listener station 410.

Accordingly, other listener stations, including the first listener station 104, are not affected.

In the present embodiment, the GSRP is defined as GARP application such as GARP multicast registration protocol (GMRP) or GARP VLAN registration protocol (GVRP). The information registered, de-registered, and disseminated via this GARP application are the stream identifier information, and other optional service requirement information. The registration of stream identifier information makes bridges/end-stations aware that reservation for this stream should only be forwarded in the direction of the registered members of the stream. Therefore, the forwarding of reservation signaling frames for this stream occurs only on ports connected to registered members.

In setting up the stream, the address of the talker station of a certain stream is known. The signaling overhead can be reduced by purposely disseminating registration/de-registration information only in the direction of the talker. More specifically, the specification in IEEE 802.1D 2004 12.2.3 can be changed as follows: a) any "GID_Join.indication" received by a GIP (Generic Interface Processor) from a given port is propagated as a "GID_Join.request" to the instance of a GID (group identification/identifier) associated with each port who is a "forwarding" port for the corresponding talker address according to the bridge's FDB (forwarding database); and b) any "GID_Leave.indication" received by a GIP from a given port is propagated as a "GID_Leave.request" to the instance of a GID associated with each port who is a forwarding port for the corresponding talker address according to the bridge's FDB.

Each GARP application uses a unique group MAC address as the destination address of GARP protocol data units (PDUs). For example, GMRP address is assigned "01-80-C2-00-00-20", GVRP address is assigned "01-80-C2-00-0021", and GSRP address is assigned one as one of the unique group MAC address.

The GSRP message structure is conformance to GARP. Encoding of GSRP attribute values is based on the format of stream identifier, and includes talker address, reservation style, bandwidth, and the like.

An end system GSRP participant issues the message "GID_ Join.request" as a join stream, and the message "GID.Leave.request" as a de-registration stream.

In case of registration and de-registration, on receipt of the message "GID_Join.indication", the GSRP application element specifies the associated port as forwarding in the reservation port map of the stream group registration entry for the reservation frames of the associated stream. If the stream group registration entry does not exist in the filtering database, a new stream group registration entry is created. If the reservation state has been established to successfully or failed in the bridge, the GSRP application element execute admission control (and resource locking/database updating if necessary) on the associated port for the associated stream, then issues corresponding reservation out of the port.

On receipt of the message "GID_Leave.indication", the GSRP application elements specifies the associated port as "filtering" in the reservation port map and "filtering" or "initial" in the stream port map of the stream group registration entry for the associated stream. If the reservation has been successful set up in the bridge for the associated port, the GSRP application element releases the locked resources. If, as a result of filtering, any port is not set in the reservation port map such as forwarding, the stream group registration entry is removed from the filtering database. If the filtering database entry does not exist in the filtering database, the indication is ignored.

In the above process, on receipt of the reservation signaling, the bridges 110-116 obtains the list of outbound ports which are set by GSRP as forwarding for the reservation signaling from the stream group registration entries. If the list is empty, the reservation signaling is discarded.

If the SI bits of the reservation are "SUCCESS", and the reservation is successful in upstream, the bridge checks on each outbound port whether the port has enough available resources for this stream. In case of ports, on which admission control is successful, if resource is not locked, the corresponding resource is locked. The port is specified as "forwarding" in the stream port map of the stream group registration entry for the associated stream. In the case of ports on which admission control is failed, it is affirmed that corresponding resource is not locked. It is also affirmed that the port is set to "filtering, admission control failure" in the stream port map of the stream group registration entry for the associated stream.

If the SI of the reservation is "FAILED" and the reservation is failed in upstream, the bridge affirms the corresponding resource is not locked for each port in the outbound ports list. The bridges also affirms that the port is set to "filtering, admission control failure" in the stream port map of the stream group registration entry for the associated stream.

In relaying the reservation message of the bridges, the "Forward" in the above description of the reservation message refers only to its logical meaning. Depend on the bridge's reservation state database, the actual relay operations can be either immediately or delayed. If the stream port map element state is newly changed, then a corresponding reservation message should be sent immediately out of that port. Otherwise, the reservation message will be sent out of the ports when the bridge's reservation refreshing timer is fired.

"Strictly guaranteed reservation" by operation of an admission control element can not be satisfied on a certain outbound port if the port is receiving the reservation resource requirements. The reservation with FAILED SI is sent out of this port. The downstream listener stations obtains explicit notification of this failure.

Even if receiving the reservation resource requirements, "Best-effort reservation" by operations of admission control element can not be satisfied on a certain outbound port, and the maximum allowable resource is reserved locally. On this outbound port, the reservation information is sent with the original resource requirement or the updated resource requirement. Also, it is sent with information about this dissatisfaction.

When the resources become available, a stream sets up "strictly guaranteed reservation" with "best-effort reservation" upon reservation refreshing. On receiving reservation signaling, the listener stations get notifications regarding if this stream is "strictly guaranteed reservation" or "best-effort reservation".

In authentication on the basis of port configuration of the bridges, for the authentication of the listener station, "registration forbidden" is used as the corresponding registrar administrative control value. The corresponding registrar instance ignores all GARP messages, and remains in the unregistered state. For the authentication of the talker station, the port ignores all reservation signaling frames that are associated with the restricted stream.

In authentication on the basis of key, the listener station or talker station should hold correct key (for example, the permitted MAC address, or password) to join the stream. According to different application, the key can be pre-configured in the bridges for either talker station or listener station, or both. The key can be provided by the talker station using the reservation signaling, and the listener station should hold the correct key to match. The key can be also provided by the listener station using registration procedure, and the talker station should hold the correct key to match.

As described above, according to exemplary embodiments of the present invention, filtering, stream group registration, and authentication are performed for the streams so that the quality of service (QoS) can be improved. Furthermore, the streams can be guaranteed to a plurality of listener stations.

Figure 7:
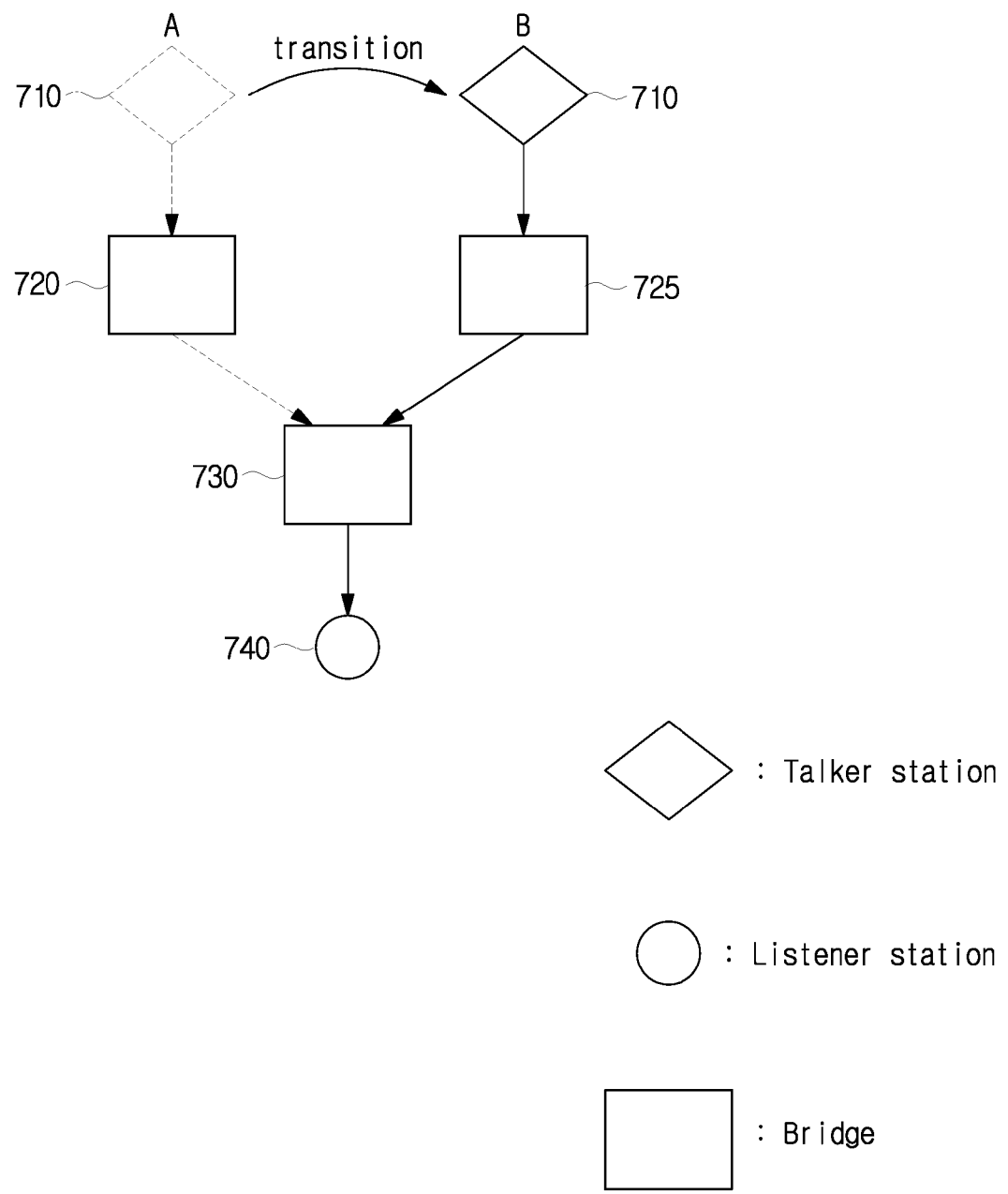
FIG. 7 is a view Illustrating a process of moving a talker station in a relay method according to an exemplary embodiment of the present invention.

FIG. 7 is a view illustrating a process of moving a talker station in a relay method according to an exemplary embodiment of the present invention. In FIG. 7, a talker station 710 transmits streams to a listener station 740 through a first bridge 720 and a third bridge 730. If the talker station 710 is moved from position A to position B, the talker station 710 may transmit streams to the listener station 740 through a second bridge 725 and the third bridge 730.

The talker station 710 periodically sends a reservation message to the listener station 740 in order to check whether the listener station 740 is connected. The listener station 740 transmits a registration message to the talker station 710. Accordingly, the bridges may set a path to relay to the talker station 710 and listener station 740 using the reservation message and registration message.

If the talker station 710 is moved from position A to position B, a bridge used to relay to the talker station 710 may be changed from the first bridge 720 to the second bridge 725. In this situation, the movement of the talker station 710 may include not only a physical move, but also the change of a bridge due to move of a connecting line.

If the bridge used to relay to the talker station 710 is changed from the first bridge 720 to the second bridge 725, an active port may be changed in the third bridge 730. For example, if the talker station 710 is moved from position A to position B as shown in FIG. 7, an active port of the third bridge 730 may be changed from a first port (not shown)

which receives a message from the talker station 710 in position A to a second port (not shown) which receives a message from the talker station 710 in position B. Here, the first port of the third bridge 730 is connected to the first bridge 720, and the second port of the third bridge 730 is connected to the second bridge 725.

If the bridge used to relay to the talker station 710 is changed as described above, a reservation message which is the first transmission from the talker station 710 in position B may arrive the listener station 740 earlier than a reservation message which is the last transmission from the talker station 710 in position A. For example, if a distance between position B and the listener station 740 is less than a distance between position A and the listener station 740, or if streams are transmitted more rapidly through the second bridge 725 than the first bridge 720, the above-described situation may occur.

For example, assuming that a reservation cancel message is the last transmission from the talker station 710 in position A and a reservation admission message is the first transmission from the talker station 710 in position B, if the messages are received in the order in which they are sent by the talker station 710, the listener station 740 may receive the reservation admission message after receiving the reservation cancel message, and as a result, a reservation may be admitted. However, if a message which is transmitted last from the talker station 710 in position A is received later than a message which is transmitted first from the talker station 710 in position B, the listener station 740 may receive the reservation admission message and the reservation cancel message sequentially, and as a result, a reservation may be canceled.

In order to prevent the above problems, if a port to receive a message is changed, the third bridge 730 may stop outputting a message transmitted from the talker station 710. Additionally, if port information previously received is the same as port information currently received, the output of the received message may be restarted.

Herein, the message containing received port information may be stored in a buffer (not shown). Determination is performed whether the last stored message and the currently received message are received from the same port or not, and if the messages are received from the same port, the output of the received message may be restarted.

For example, if a message (hereinafter referred to as "first message") which is transmitted last from the talker station 710 in position A is received later than a message (hereinafter referred to as "second message") which is transmitted first from the talker station 710 in position B due to the movement of the talker station 710, an error may arise in the messages because the order of the first message and the second message is reversed. Accordingly, the output of the received message may be stopped as soon as the port of the third bridge 730 to receive a message is changed from the first port to the second port. Therefore, the first and second messages containing errors may not be output from the third bridge 730 to the listener station 740.

Subsequently, determination is performed whether port information of a previously received message is the same as port information of a currently received message or not. In other words, if the talker station 710 in position B transmits a third message and a fourth message after transmitting the second message and if the third bridge 730 sequentially receives the second, first, third and fourth messages, the third and fourth messages may be received at the second port of the third bridge 730. Accordingly, the third message (that is, the previously received message) stored in the buffer (not shown) and the fourth message (that is, the currently received message) have the same port information, so the third bridge 730 may restart transmission of the fourth message to the listener station 740.

As a result, the third bridge 730 may not transmit the first and second messages containing errors to the listener station 740. In other words, it is impossible to output the messages containing errors.

Additionally, two or more messages (hereinafter referred to as "first messages") which are transmitted last from the talker station 710 in position A may be received later than a message (hereinafter referred to as "second message") which is transmitted first from the talker station 710 in position B. In this situation, in order not to output the messages in which the order thereof is reversed, the third bridge 730 may count the number of cases in which port information of a previously received message is the same as port information of a currently received message. If the counted number of cases is greater than a reference value, the third bridge 730 may restart transmission of messages.

For example, if three messages are referred to as the first messages, if the talker station 710 in position B transmits a third message and a fourth message after transmitting the second message, and if the third bridge 730 sequentially receives the second, first, third, fourth, fifth and sixth messages, the reference value needs to be set greater than a value of 4. Description will be given assuming that the reference value is set to a value of 4.

The third bridge 730 may receive the second message from the second port, and then receive the first messages from the first port. In other words, the three messages may be received from the first port after the port is changed. However, since the reference value is set to a value of 4, transmission from the third bridge 730 may not be restarted even if the three first messages are received from the first port. Next, if the third bridge 730 receives the third to sixth messages, the four messages may be received from the second port, so the counted number may be 4. Accordingly, the third bridge 730 may restart transmission of the sixth message to the listener 740.

As a result, the third bridge 730 may not transmit the first and second messages containing errors to the listener station 740. In other words, it is impossible to output a plurality of messages containing errors.

In addition, the talker station 710 may transmit the messages to which serial numbers are assigned, and thus the third bridge 730 may check the order of the messages. For example, the talker station 710 may transmit the messages, to which serial numbers are assigned in the order in which they are sent. When the serial numbers are assigned to the messages, the third bridge 730 is able to determine the order of the messages in the order in which the messages are transmitted from the talker station 710 even if the order of the messages is changed, and then output the messages to the listener station 740.

For example, the talker station 710 assigns serial numbers 1, 2, 3, 4 and 5 to the messages in the order in which they are sent. Additionally, a controller (not shown) of the third bridge 730 may check the serial numbers of the received messages, and may control so that the messages in which the order thereof is reversed cannot be transmitted.

Additionally, the third bridge 730 may assign the priority to the messages, and may determine the order of the messages. For example, if the port to receive messages is changed, the third bridge 730 may stop outputting the received messages. Furthermore, the third bridge 730 may compare the priorities of a previously received message and a currently received message, and may control so that the received messages can be output according to the priority.

For example, if the first port and second port of the third bridge 730 simultaneously receive messages, the third bridge 730 may output only the message having the higher priority among the two messages.

Accordingly, it is possible to prevent the order of messages from being changed by the movement of the talker station 710.

Figure 8:
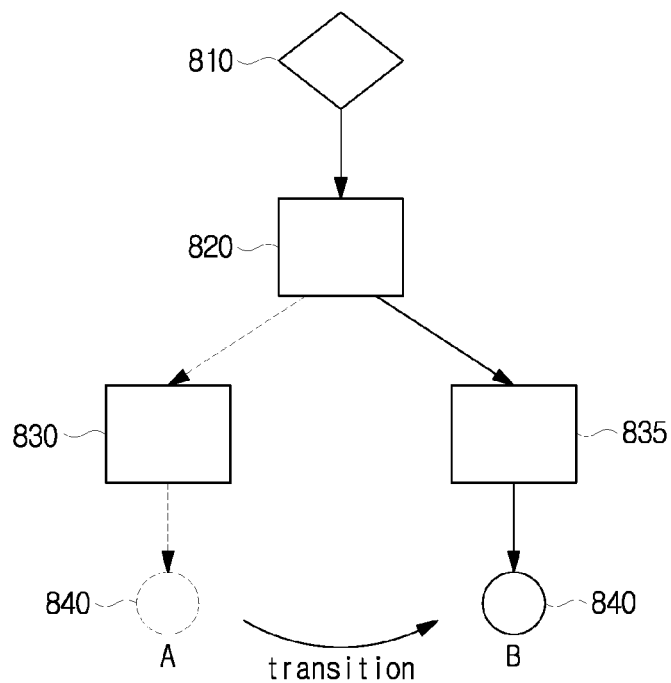
FIG. 8 is a view illustrating a process of moving a listener station in a relay method according to an exemplary embodiment of the present invention.

FIG. 8 is a view illustrating a process of moving a listener station in a relay method according to an exemplary embodiment of the present invention. In FIG. 8, a talker station 810 transmits streams to a listener station 840 through a first bridge 820 and a second bridge 830. If the listener station 840 is moved from position A to position B, the talker station 710 may transmit streams to the listener station 840 through the first bridge 820 and a third bridge 835.

The listener station 840 periodically sends a registration message to the talker station 810. Additionally, the first, second and third bridges 820, 830 and 835 check whether the listener station 840 exists, by referring to the registration message.

Accordingly, if the listener station 840 is moved from position A to position B, the second bridge 830 cannot receive the registration message, so it is possible to determine that the listener station 840 is disconnected. Additionally, the third bridge 835 receives the registration message, and thus it is possible to determine that the listener station 840 is connected.

Even if the listener station 840 is moved, problems may arise in the same manner as in the situation where the talker station 810 is moved. However, these problems may be solved using the method described above with reference to FIG. 7, so detailed description of the movement of the listener station 840 is omitted.

According to the above method, the talker station 810 may seamlessly transmit the streams to the listener station 840 even when the listener station 840 is moved.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A relay method comprising:
   receiving messages from a station;
   stopping output of the received messages if a port to receive the messages is changed; and
   restarting the output of the received messages if port information of a previously received message is the same as port information of a currently received message.

2. The method as claimed in claim 1, wherein the station is a talker station or a listener station.

3. The method as claimed in claim 1, wherein the restarting comprises:
   storing the received messages in a buffer; and
   determining whether the last message stored in the buffer and the currently received message are received from the same port.

4. The method as claimed in claim 1, wherein the restarting comprises:
   counting the number of cases in which the port information of the previously received message is the same as the port information of the currently received message; and
   restarting the output of the received messages, if the counted number of cases is greater than a reference value.

5. A bridge apparatus comprising:
   a port which receives messages transmitted from a station; and
   a controller which stops output of the received messages if the port to receive the messages is changed, and restarts the output of the received messages if port information of a previously received message is the same as port information of a currently received message.

6. The bridge apparatus as claimed in claim 5, wherein the station is a talker station or a listener station.

7. The bridge apparatus as claimed in claim 5, further comprising a buffer which stores the received messages,
   wherein the controller determines whether the last message stored in the buffer and the currently received message are received from the same port.

8. The bridge apparatus as claimed in claim 5, wherein the controller counts the number of cases in which the port information of the previously received message is the same as the port information of the currently received message, and restarts the output of the received messages if the counted number of cases is greater than a reference value.

* * * * *